US012423979B2

(12) United States Patent
Lee et al.

(10) Patent No.: US 12,423,979 B2
(45) Date of Patent: Sep. 23, 2025

(54) PER-CLIP VIDEO OBJECT SEGMENTATION USING MACHINE LEARNING

(71) Applicant: Adobe Inc., San Jose, CA (US)

(72) Inventors: Joon-Young Lee, San Jose, CA (US); Seoung Wug Oh, San Jose, CA (US); Sanghyun Woo, Daejeon (KR); Kwanyong Park, Daejeon (KR)

(73) Assignee: Adobe Inc., San Jose, CA (US)

( * ) Notice: Subject to any disclaimer, the term of this patent is extended or adjusted under 35 U.S.C. 154(b) by 492 days.

(21) Appl. No.: 17/853,671

(22) Filed: Jun. 29, 2022

(65) Prior Publication Data
US 2024/0005663 A1   Jan. 4, 2024

(51) Int. Cl.
*G06V 20/40*   (2022.01)
*G06F 16/735*   (2019.01)
*G06F 16/783*   (2019.01)
*G06T 7/11*   (2017.01)
*H04N 21/472*   (2011.01)

(52) U.S. Cl.
CPC ............ *G06V 20/49* (2022.01); *G06F 16/735* (2019.01); *G06F 16/784* (2019.01); *G06T 7/11* (2017.01); *H04N 21/47205* (2013.01); *G06T 2207/10021* (2013.01)

(58) Field of Classification Search
CPC ...... G06V 20/49; G06V 10/26; G06V 10/761; G06V 10/82; G06V 20/46; G06F 16/735; G06F 16/784; G06F 16/738; G06T 7/11; G06T 2207/10021; H04N 21/47205
See application file for complete search history.

(56) References Cited

U.S. PATENT DOCUMENTS

2019/0138830 A1*   5/2019   Justice ................... G06V 20/52

FOREIGN PATENT DOCUMENTS

SG        10202009757X      *   4/2021

OTHER PUBLICATIONS

Cheng et al. ,Rethinking Space-Time Networks with Improved Memory Coverage for Efficient Video Object Segmentation, 2021, 35th Conference on Neural Information Processing Systems (Year: 2021).*

(Continued)

*Primary Examiner* — Said M Elnoubi
(74) *Attorney, Agent, or Firm* — Nicholson De Vos Webster & Elliott LLP

(57) ABSTRACT

Embodiments are disclosed for performing per-clip object segmentation of objects in a video sequence using machine learning. In particular, in one or more embodiments, the disclosed systems and methods comprise receiving a query video sequence and memory data, the memory data including a memory video frame from the query video sequence and an annotated memory video frame including an object mask for an object in the memory video frame, segmenting the query video sequence into a plurality of query video clips and passing a first set of query video frames of a first query video clip and the memory data through a trained encoder-decoder network, predicting a modified set of query video frames, including predictions of object masks for the object, and updating the memory data to include one or more frames of the first set of query video frames and the modified set of query video frames.

20 Claims, 8 Drawing Sheets

(56) References Cited

OTHER PUBLICATIONS

Cheng et al. "Rethinking Space-Time Networks with Improved Memory Coverage for Efficient Video Object Segmentation," NeurIPS, 2021, 19 pages.
Oh et al., "Video Object Segmentation using Space-Time Memory Networks," Proceedings of the IEEE/CVF International Conference on Computer Vision, 2019, pp. 9226-9235.

* cited by examiner

PER-CLIP VIDEO OBJECT SEGMENTATION USING MACHINE LEARNING

BACKGROUND

Video object segmentation is a task of separating the pixels of one or more objects in all frames of a given video sequence from the background pixels. Video object segmentation is becoming an increasingly important component for many video editing tasks, as video content has become one of the most popular forms of shared media content. Typically, video object segmentation is performed by applying a mask to the pixels associated with a target object in each frame of a given video sequence. However, video object segmentation can be challenging as the appearance of the target object can change drastically due to occlusions and drifts, and as the length of the video sequence increases.

SUMMARY

Introduced here are techniques/technologies that allow a digital design system to perform per-clip object segmentation of objects in video sequences using machine learning. In particular, in one or more embodiments, the digital design system can receive a query video sequence and memory data (e.g., a frame from the query video sequence and an annotated version of the frame that includes at least one object segmentation mask for at least one object) as an input and process the input through a trained encoder-decoder network. After segmenting the query video sequence into a plurality of shorter query video clips with a fixed number of frames, sets of query video frames for each query video clip are serially processed through the encoder-decoder network. For each query video clip, the encoder-decoder network predicts a modified set of query video frames, the modified set of query video frames including predictions of object segmentation masks for the object in each query video frame of the set of query video frames. The memory data can then be updated with at least one frame that was previously a query video frame and the corresponding modified query video frame with an object segmentation mask to improve accuracy in the processing of subsequent query video clips.

The encoder-decoder network is trained using training data that includes static images with corresponding object masks and training video data.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
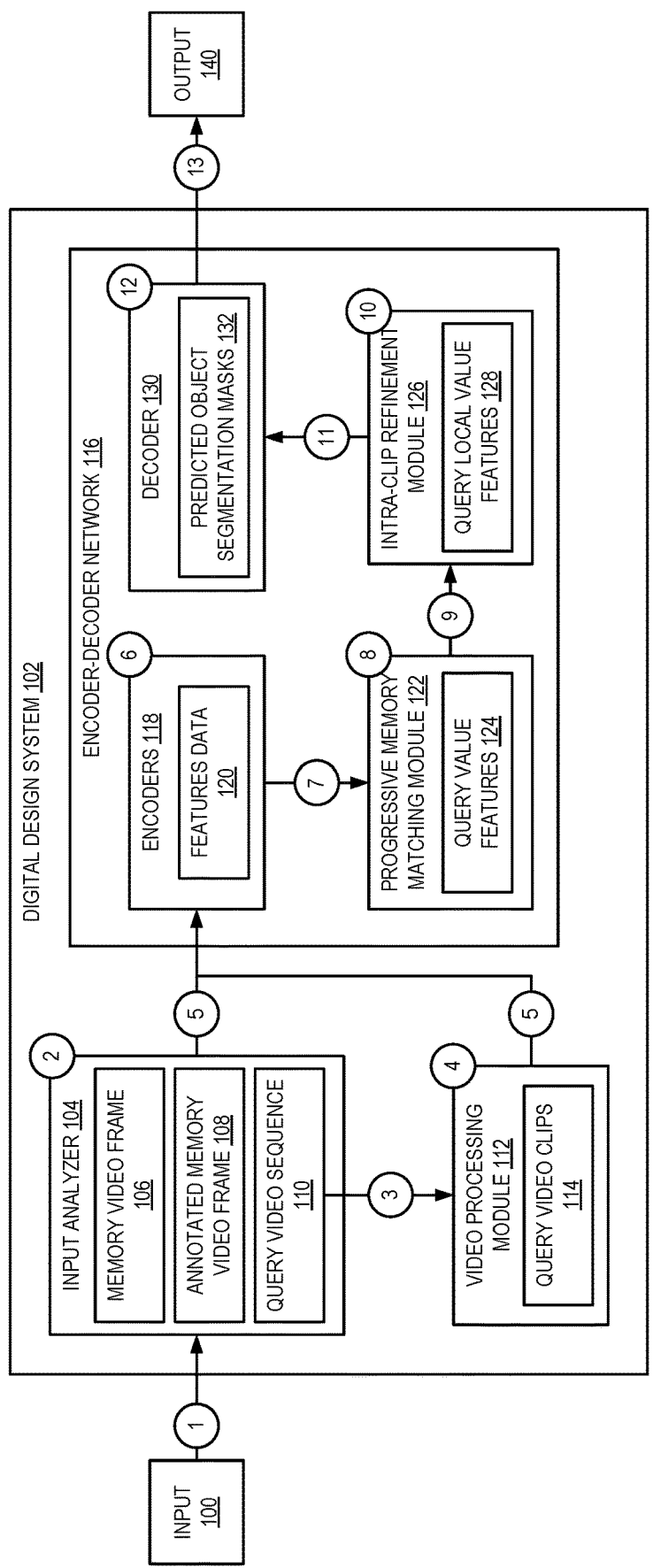
FIG. 1 illustrates a diagram of a process of performing per-clip object segmentation of video sequences using trained networks in accordance with one or more embodiments.

One or more embodiments of the present disclosure include a digital design system that uses a trained encoder-decoder network to perform per-clip object segmentation of objects in video sequences. The input to the digital design system includes a query video sequence and memory data. The memory data includes video frames from the video sequence and given and/or previously predicted version of the video frames from the video sequence with object segmentation masks for one or more objects. Video object segmentation involves additional properties that make predicting object masks challenging. For example, as the length of the video sequence increases, a target object to be masked can change dramatically in shape and/or size from initial memory data. This can result in object masks in initial memory data frames of a video sequence being less informative for latter video frames of the video sequence.

Some existing solutions are directed to semi-supervised video object segmentation to segment foreground objects in every frame of a video given a ground truth object mask in the first frame. Space-Time Memory (STM) networks are a memory-based approach that encodes and stores the past frames with the corresponding masks as memory then estimates the mask of the current frame through learned spatio-temporal memory matching. This solution iterates the memory update and the mask prediction steps frame-by-frame. Another existing solution, called Space-Time Correspondence Networks (STCN) determined that memory updates may not be needed at every frame, and instead, update the memory at every fifth frame. However, memory-based approaches that process a video sequence frame-by-frame have an upper bound of the efficiency they can achieve as they process frames sequentially.

To address these issues, after receiving a query video sequence and memory data as input, the digital design system segments the query video sequence into sets of consecutive query video frames (e.g., query video clips), allowing the object segmentation process to be conducted clip-by-clip. The video frames of the query video clip and memory data are then serially processed through a trained encoder-decoder network. The frames of the query video sequence are processed through a key encoder to extract query key features, memory video frames from the memory data are processed through a key encoder to extract memory key features, and annotated memory video frames from the memory data are processed through a value encoder to extract memory value features. The features are then processed by a progressive memory matching module that computes a similarity between pixels using the query key features and memory key features of a segment of the query video clip in addition to at least the value features for at least one frame from a previous segment, which is used as attention to the memory value features to compute query value features. The query value features are then passed to an intra-clip refinement module, which uses transformer-based attention to refine the retrieved query value features based on the spatiotemporal correlation among the pixels in the query video clip. Finally, a decoder receives the output of the intra-clip refinement module and predicts the object mask of the query video frames.

Performing object segmentation in a clip-by-clip, or per-clip, manner provides benefits over existing solutions. First, predicting an object mask clip-by-clip provides the model access to nearby frames before making predictions, while frame-by-frame predictions provides no access for the networks to prior or subsequent frames. Enabling access to nearby frames allows for the exchange of information among the frames in a video clip, which can optimize predictions of object masks for the video clip. Processing the frames of a clip as a batch leverages the parallel processing architecture of modern GPU systems, allowing the frames to be processed in parallel, resulting in increased efficiency and improved runtime. Further, by performing a progressive memory matching process that passes information within a video clip, the embodiments described herein provides a lightweight solution to augment the memory and boosts the memory readout accuracy when the memory update interval is long (e.g., when the number of frames in the video clip is large). In addition, an intra-clip refinement module optimizes the query value features using intra-clip correlation. Specifically, a transformer aggregates information in a spatial-temporal neighborhood and refines the query value features, resulting in consistent and robust mask predictions.

FIG. 1 illustrates a diagram of a process of performing per-clip object segmentation of video sequences using trained networks in accordance with one or more embodiments. As shown in FIG. 1, a digital design system 102 receives an input 100, as shown at numeral 1. For example, the digital design system 102 receives the input 100 from a user via a computing device or from a memory or storage location.

As illustrated in FIG. 1, the digital design system 102 includes an input analyzer 104 that receives the input 100. In some embodiments, the input analyzer 104 analyzes the input 100, at numeral 2. In some embodiments, the input analyzer 104 analyzes the input 100 to identify a memory video frame 106, an annotated memory video frame 108, and query video sequence 110. In one or more embodiments, the memory video frame 106 and the annotated memory video frame 108 are a same frame taken from the query video sequence 110. The annotated memory video frame 108 is a modified version of memory video frame 106, including an object segmentation mask of an object in the memory video frame 106. In one or more embodiments, the memory video frame 106 and the annotated memory video frame 108 can include a plurality of frames from query video sequence 110. After the input analyzer 104 analyzes the input 100, the query video sequence 110 is sent to a video processing module 112, as shown at numeral 3.

The video processing module 112 generates query video clips 114 by segmenting the query video sequence 110, at numeral 4. In one or more embodiments, the video processing module 112 segments the query video sequence 110 based on a memory update interval. The memory update interval is a numerical value representing a number of video frames, L, where the value of L can vary (e.g., five frames, ten frames, etc.). For example, given a memory update interval of five, each of the query video clips 114 would be generated as including five video frames of the query video sequence 110. The query video clips 114, the memory video frame 106, and the annotated memory video frame 108 are then passed to an encoder-decoder network 116, as shown at numeral 5. The encoder-decoder network 116 can include one or more encoders 118, a progressive memory matching module 122, an intra-clip refinement module 126, and a decoder 130.

In one or more embodiments, the encoder-decoder network 116 includes one or more trained neural networks. In one or more embodiments, a neural network includes deep learning architecture for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

Figure 2:
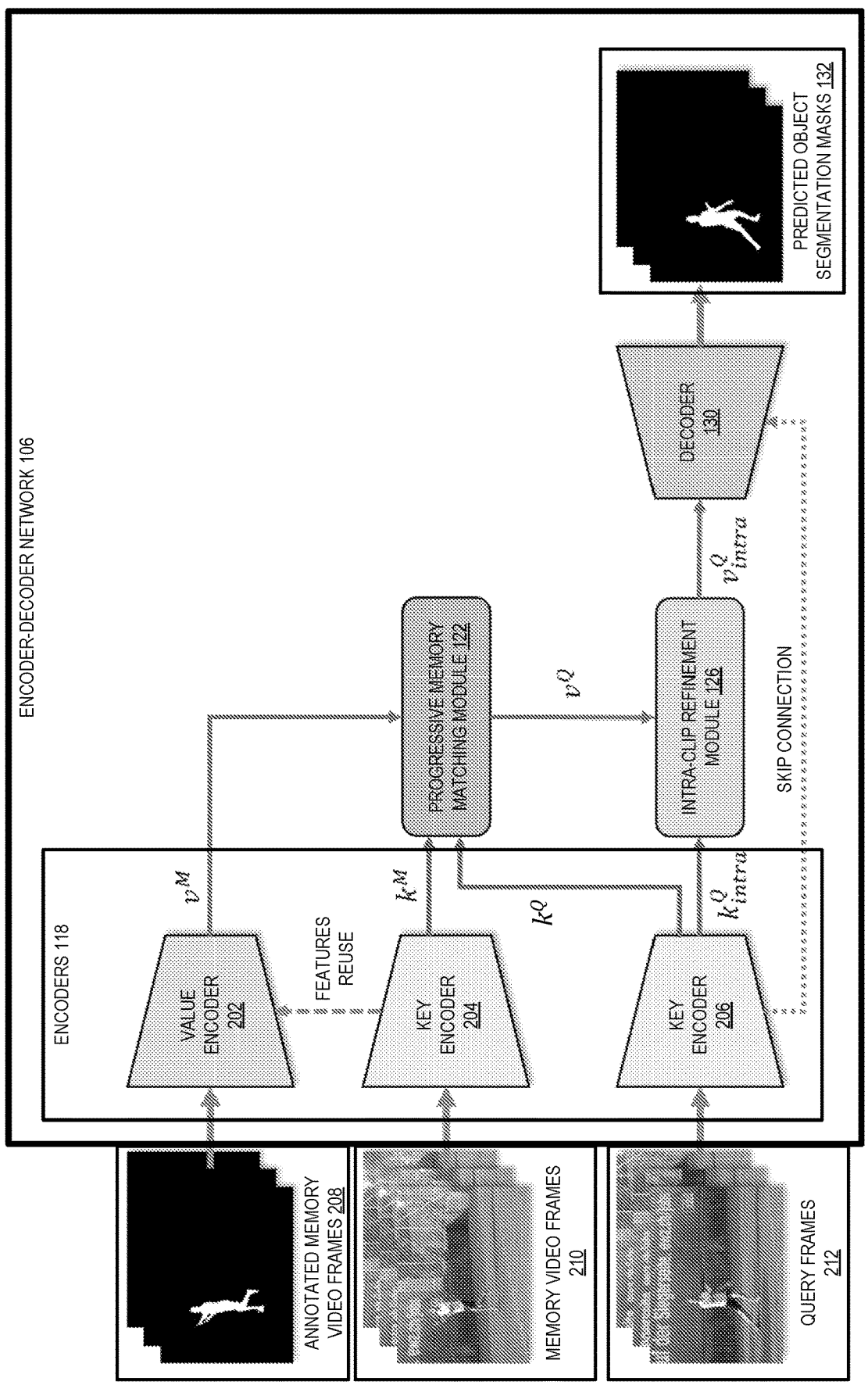
FIG. 2 illustrates a diagram of an encoder-decoder network trained to perform per-clip object segmentation of video sequences in accordance with one or more embodiments.

In one or more embodiments, the encoders 118 generates features data 120 for each of the query video clips 114, the memory video frame 106, and the annotated memory video frame 108, at numeral 6. The encoders 118 can include a value encoder and a key encoder trained to extract features data from input video frames. The features data 120 can include key features and value features generated by passing the query video clips 114, the memory video frame 106, and the annotated memory video frame 108 through key encoders and value encoders. FIG. 2 illustrates a diagram of an encoder-decoder network trained to perform per-clip object segmentation of video sequences in accordance with one or more embodiments. As illustrated in FIG. 2, encoders 118 can include a value encoder 202 and key encoders 204 and 206. In one or more embodiments, key encoders 204 and 206 are a single key encoder configured with the same parameters.

The value encoder 202 receives annotated memory video frames 208 as input. The annotated memory video frames 208 include one or more frames from a video sequence with an object segmentation mask for at least one object. The value encoder 202 encodes the object segmentation mask from the annotated memory video frames 208 into value features, $v^m$.

The key encoder 204 receives the memory video frames 210 as input and extracts key features, $k^M$. Similarly, the key encoder 206 receives query frames 212 as input and extracts key features, $k^Q$. The query frames 212 are frames from a query video clips generated by a video processing module (e.g., video processing module 112). In one or more embodiments, the key features, $k^M$ and $k^Q$ are used to find spatio-temporal correspondence by a progressive memory matching module (e.g., progressive memory matching module 122).

In one or more embodiments, the value encoder 202 also receives data related to corresponding memory video frames 210, where the annotated memory video frames 208 and the memory video frames 210 are the same frame(s) from the video sequence. In such embodiments, the value encoder 202 encodes the object segmentation mask from the annotated memory video frames 208 and corresponding memory video frames 210 into value features, $v^m$. For example, given the memory frames key features and the initial value features extracted by the value encoder 202, a fusion block fuses them together, resulting in memory frames value features, $v^M$. In one or more embodiments, the fusion block is instantiated with two ResBlocks and one Convolutional Block Attention Module (CBAM) block.

The key encoder 206 can further utilize the query frames 212 to produce local key features, $k_{intra}^Q$. The local key features, $k_{intra}^Q$, are used to find spatio-temporal correlation for the refinement within the query video clips and are tailored to deal with a relatively shorter range of frame intervals. This is in contrast to the query frames key features, which are targeted to obtain spatio-temporal correspondences between query and memory frames, focusing on learning more long-range correspondences. In one or more embodiments, the encoders 118 process each frame, or frame and mask, independently and then concatenates the features along the temporal dimension. For example, given T memory video frames and L query frames, the encoders 118 extracts the following features:

memory frames value features: $v^M \in \mathbb{R}^{THW \times C_v}$ memory frames key features: $k^M \in \mathbb{R}^{THW \times C_k}$ query frames key features: $k^Q \in \mathbb{R}^{LHW \times C_k}$ query frames local key features: $k_{intra}^Q \in \mathbb{R}^{LHW \times C_{k'}}$ where HW is the spatial dimension size of the feature maps.

Returning to FIG. 1, the features data 120 generated by the encoders 118 are then passed to a progressive memory matching module 122, as shown at numeral 7. In one or more embodiments, the progressive memory matching module 122 computes query value features 124, $v^Q$, based on the features data, at numeral 8. As illustrated in FIG. 2, the progressive memory matching module 122 receives memory frames key features, $k^M$, and query frames key features, $k^Q$. The progressive memory matching module 122 first computes a pairwise similarity between all query and memory pixels in a non-local manner. For example, given the query frames key features, $k^Q$, and the memory frames key features, $k^M$, an affinity matrix, $A \in \mathbb{R}^{LHW \times THW}$ between them can be computed as follows:

$$A(k^Q, k^M)_{i,j} = \frac{\exp(sim(k_i^Q, k_j^M))}{\Sigma_j \exp(sim(k_i^Q, k_i^M))}$$

where sim is a similarity measure and $A_{i,j}$ denotes the affinity score at the i,j-th position. Then, each query point retrieves information in the memory frames value features, $v^M$, based on the affinity (e.g., weighted sum) as follows:

$$v^Q = \text{Read}(k^Q, k^M, v^M) = A(k^Q, k^M)v^M.$$

In one or more embodiments, the progressive memory matching module 122 uses a progressive memory matching process that augments the memory key features and value features temporarily by using the intermediate information in the query video clip to increase accuracy. The progressive memory matching process splits a query video clip into S segments with a frame interval of F and augments the memory features at every F-th frame. After processing each segment, the memory key features and value features for the next segment are appended with the query frame key feature and a query frame value feature, respectively. In one or more embodiments, the memory matching process bypasses all layers (e.g., the decoder and the value encoder) to compute the memory values features and does not incur any extra computation. After processing all segments in a query video clip, the temporary memory is discarded from main memory. The progressive memory matching process can be summarized as follows:

$$v^{Q_t} = \text{Read}(k^{Q_t}, k^{M_t}, v^{M_t}) = A(k^{Q_t}, k^{M_t})v^{M_t},$$

$$s.t. \; k^{M_t} = \text{Concat}[k^{M_{t-1}}, \text{last}(k^{Q_{t-1}})],$$

$$v^{M_t} = \text{Concat}[v^{M_{t-1}}, \text{last}(v^{Q_{t-1}})],$$

$$k^{M_1} = k^M, v^{M_1} = v^M,$$

where $v^{Q_t}$, $k^{Q_t}$ denotes the retrieved value and key of the t-th query segment, and $k^{M_t}$, $v^{M_t}$ represent memory key and value features to produce $v^{Q_t}$, respectively. The final value feature $v^Q$ is a concatenation of each segment's output value, $$v^Q = \text{Concat}[v^{Q_1}, v^{Q_2}, \ldots, v^{Q_S}].$$

Figure 3:
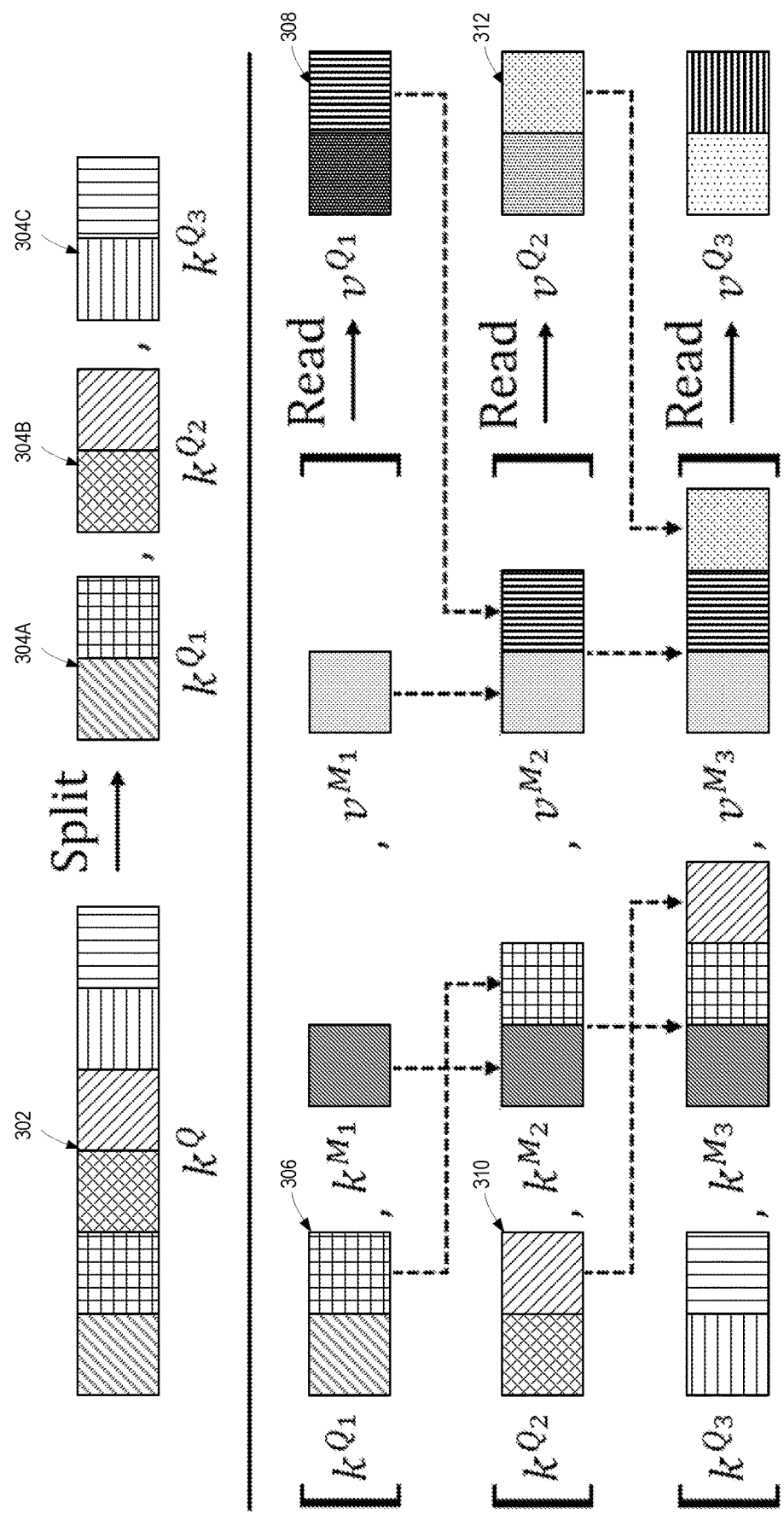
FIG. 3 illustrates a progressive memory matching process used to generate query frames value features in accordance with one or more embodiments.

FIG. 3 illustrates a progressive memory matching process used to generate query frames value features in accordance with one or more embodiments. In the example of FIG. 3, a query video clip (e.g., one of query video clips 114) includes six query frames, where processing the six query frames through a key encoder results in query frames key features 302. In the progressive memory matching process, the progressive memory matching module 122 splits query frames key features 302 into a plurality of segments (e.g., first segment 304A, second segment 304B, and third segment 304C), where each segment has a length of two frames (F=2), resulting in three segments (S=3). The first segment 304A is processed by computing the pairwise similarity between the first segment 304A and the memory frames key features, $k^{M_1}$, which is used as attention for the memory frames value features, $v^{M_1}$, to generate query frames value features, $v^{Q_1}$. As part of processing the second segment 304B, the second frame 306 (e.g., the F-th frame) from the first segment 304A is appended to the memory frames key features, resulting in memory frames key features $k^{M_2}$. Similarly, the second frame 308 (e.g., the F-th frame) from the query frames value features, $v^{M_2}$, is appended to the memory frames value features, resulting in memory frames value features $v^{M_2}$. This process is repeated for each subsequent segment of the query frames key features 302. For example, when processing the third segment 304C, the second frame 310 from the second segment 304B is appended to the memory frames key features generated when processing the second segment 304B, resulting in memory frames key features $k^{M_3}$. Similarly, the second frame 312 from the query frames value features, $v^{Q_2}$, is appended to the memory frames value features generated when processing the second segment 304B, resulting in memory frames value features $v^{M_3}$.

Returning to FIG. 1, the query value features 124 generated by the progressive memory matching module 122 are then passed to an intra-clip refinement module 126, as shown at numeral 9. In one or more embodiments, the intra-clip refinement module 126 is configured to capture spatio-temporal structure across multiple query frames, at numeral 10. Although the progressive memory matching module 122 can capture the most relevant value features, $v^Q$, from the memory video frames and annotated memory video frames, the results can include errors when there are new target objects, occlusions, and/or large deformations of object. The intra-clip refinement module 126 also receives the query local key features, $k_{intra}^Q$, generated by a key encoder (e.g., key encoder 206) using the query frames. The intra-clip refinement module 126 adopts transformer-based attention to refine the retrieved value features, $v^Q$, based on the spatio-temporal correlation among the pixels in the query video clip. The attention layer first computes the affinity matrix among query local key features, $k_{intra}^Q$, and then the value is propagated within the frames of a query video clip. The retrieved query local value features 128, $v_{intra}^Q$, are enhanced by the propagated values via element-wise sum. This process can be summarized as follows:

$$v_{attn} = A(\phi(k_{intra}^Q), \phi(k_{intra}^Q))\psi(v^Q) + v^Q$$

where $\phi$ and $\psi$ represent separate normalizations followed by linear projection layers for key and value, respectively. The feed-forward network (FFN) is kept the same as the standard. The final output of the intra-clip refinement module 126 can be formulated as:

$$v_{intra}^Q = \text{FFN}(v_{attn}) + v_{attn}.$$

As the motion of an object is continuous across the frames, the propagation across several consecutive frames can be constructed in local spatio-temporal windows. In one or more embodiments, a locality constraint is imposed on the intra-clip refinement by adopting a 3D-shifted window mechanism to the attention layers. This can result in largely diminishing the ambiguity of correspondences, while also reducing the computational cost. The query local value features 128, $v_{intra}^Q$, generated by the intra-clip refinement module 126 are then passed to a decoder 130, as shown at numeral 11.

In one or more embodiments, the decoder 130 generates predicted object segmentation masks 132, at numeral 12. The decoder 130 receives the query local value features 128, $v_{intra}^Q$, from intra-clip refinement module 126 and predicts the object segmentation for the query frames of the query video clips 114. In one or more embodiments, the decoder 130 gradually upsamples the decoded features and fuses it with the backbone features through a skip-connection. To handle the multi-object scenario, a soft-aggregation operation can be used to merge the predicted mask of each object.

In one or more embodiments, the digital design system 102 provides an output 140, as shown at numeral 13. The output 140 can include a masked video sequence, which can be a modified version of the query video sequence 110 modified to include one or more object segmentation masks on one or more object masked in the annotated memory video frame 108. In some embodiments, after the process described above in numerals 1-12, the output 140 can be sent to the user or computing device that initiated the per-clip object segmentation process with the digital design system 102, to another computing device associated with the user or another user, or to another system or application. For example, after the process described above in numerals 1-12, the output 140 can be displayed in a user interface of a computing device.

Figure 4:
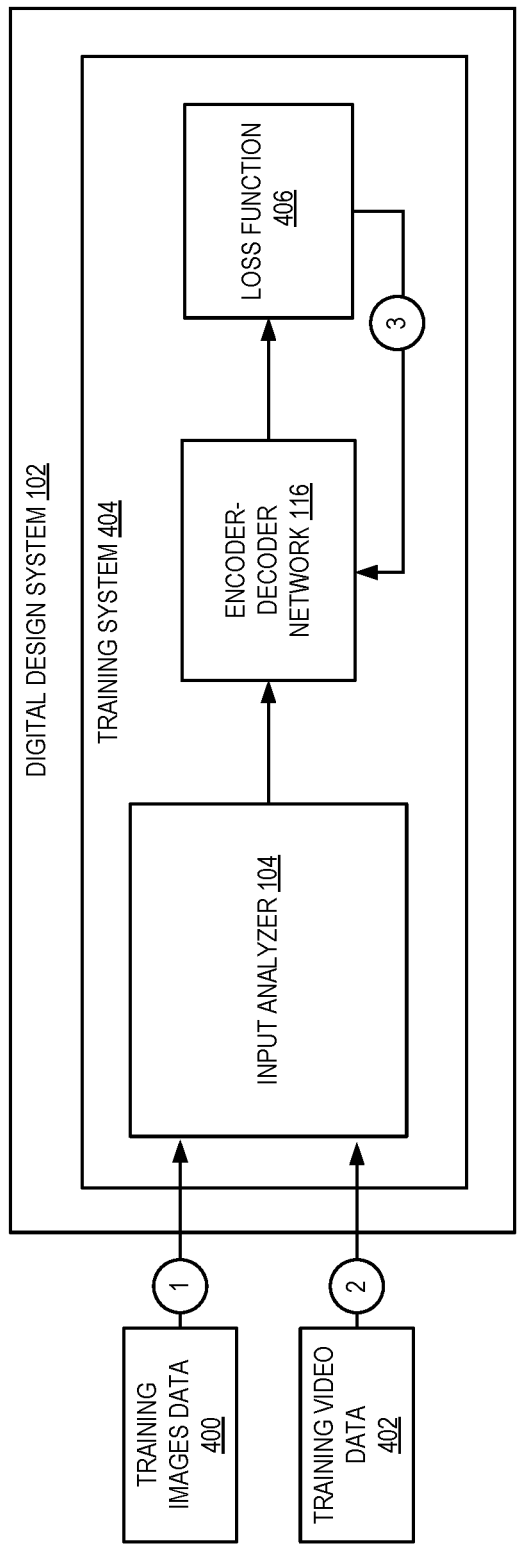
FIG. 4 illustrates a diagram of a process of training machine learning models to perform per-clip object segmentation of objects in video sequences in accordance with one or more embodiments.

FIG. 4 illustrates a diagram of a process of training machine learning models to perform per-clip object segmentation of objects in video sequences in accordance with one or more embodiments. In one or more embodiments, a training system 404 is configured to train neural networks (e.g., components of encoder-decoder network 116) to generate predicted object segmentation mask for objects in video frames of query video sequences using memory data. The training system 404 can include the components, as described above with respect to FIG. 1. In some embodiments, the training system 404 is a part of a digital design system 102. In other embodiments, the training system 404 can be a standalone system, or part of another system, and deployed to the digital design system 102. For example, the training system 404 may be implemented as a separate system implemented on electronic devices separate from the electronic devices implementing digital design system 102.

The process of training the machine learning models is a two-stage training process that includes pre-training on image data and fine-tuning on video data. In a first stage of the training process, at numeral 1, the digital design system 102 receives a training images data 400. The training images data 400 can be received from a user via a computing device or from a memory or storage location. In one or more embodiments, the training images data 400 includes synthetic video samples simulated by applying random deformation on static images and corresponding object masks. The training images data 400 are passed through the encoder-decoder network 116 and the output is provided to loss functions 406. A loss function, $L_{image}$, is calculated based on the output of the encoder-decoder network 116 and the training images data 400. The loss function can be a cross-entropy loss function, or its variants. In one or more embodiments, a bootstrapped cross-entropy loss function is used.

In a second stage of the training process, at numeral 2, the digital design system 102 receives training video data 402. For example, the digital design system 102 receives the training video data 402 from a user via a computing device or from a memory or storage location. In one or more embodiments the training video data 402 includes at least a training video sequence and at least one ground truth frame with an object segmentation mask for an object. The second stage trains the model to learn long-range correspondences and intra-clip correlations. As part of the training process, multiple frames (e.g., 2N+1 frames) are selected from the training video sequence. In one or more embodiments, one image (e.g., frame) with the ground truth label and two video clips of length N, from the training video sequence, are selected. The model then sequentially processes each of the video clips and passes the output to the loss functions 406.

The second stage of the training process introduces video clip-level supervision that aims to capture fine-grained temporal changes of objects. Specifically, given a predicted object mask, $\tilde{m} \in \mathbb{R}^{KH'W'}$, and ground truth, $m \in \mathbb{R}^{KH'W'}$, video clip-level supervisions with a dice coefficient can be implemented as follows:

$$\mathcal{L}_{clip}(\tilde{m}, m) = \sum_{k=1}^{K} \left[1 - \text{Dice}(\tilde{m}^k, m^k)\right]$$

where $\tilde{m}^k$ denotes the predicted mask of the k-th object, and K, H', W' represent the total number of objects, the height of the image, and the width of the image, respectively. The final loss function is a combination of the clip-level supervision and the image-level supervision (e.g., cross-entropy), as follows:

$$L_{total} = L_{clip} + L_{image}.$$

The loss, $\mathcal{L}$, is then backpropagated to the encoder-decoder network 116 to optimizes its predictions, at numeral 3.

Figure 5:
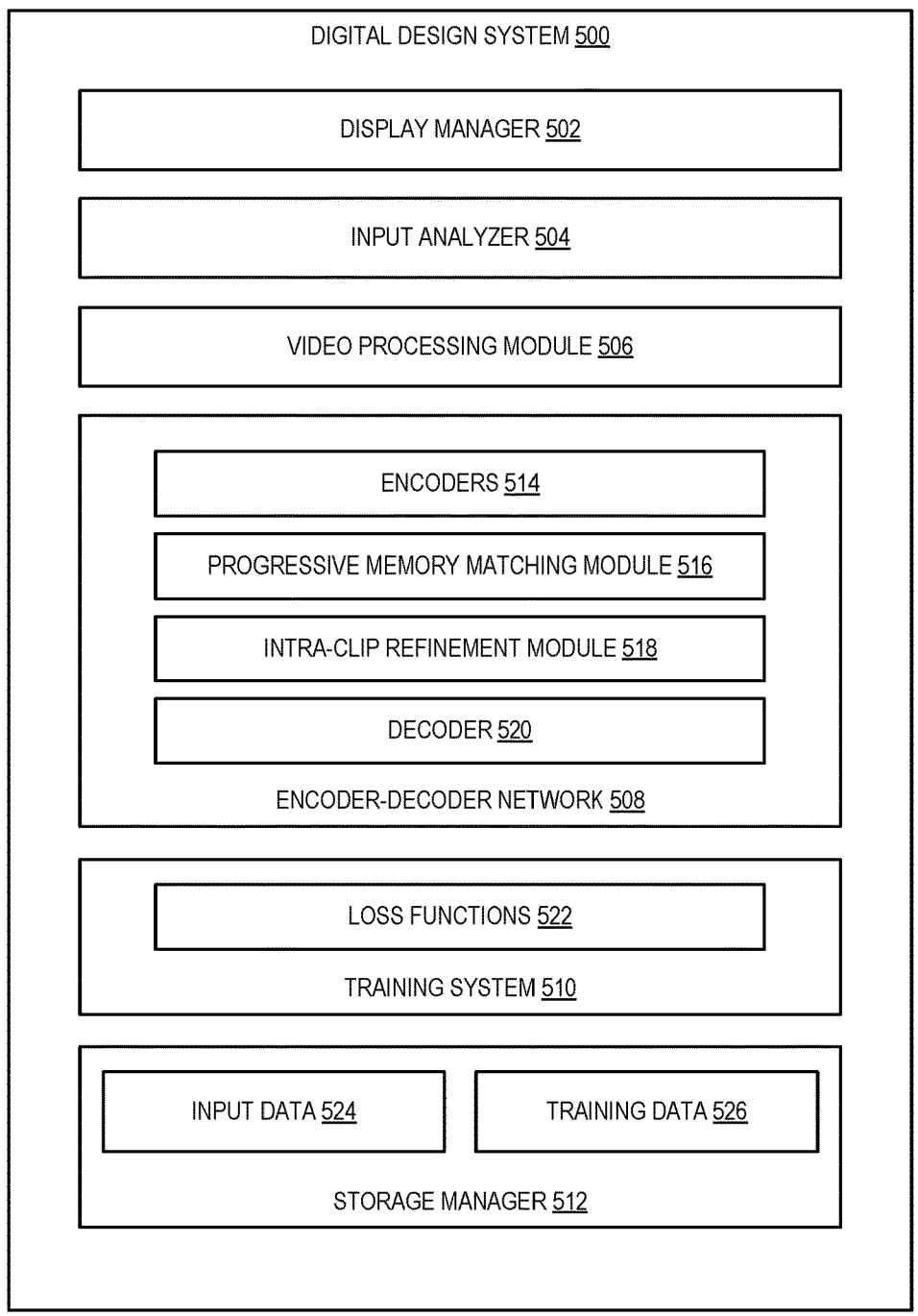
FIG. 5 illustrates a schematic diagram of a digital design system in accordance with one or more embodiments.

FIG. 5 illustrates a schematic diagram of a digital design system (e.g., "digital design system" described above) in accordance with one or more embodiments. As shown, the digital design system 500 may include, but is not limited to, a display manager 502, an input analyzer 504, a video processing module 506, an encoder-decoder network 508, a training system 510, and a storage manager 512. As shown, the encoder-decoder network 508 includes encoders 514, progressive memory matching module 516, intra-clip refinement module 518, and decoder 520. The training system 510 includes loss functions 522. The storage manager 512 includes input data 524 and training data 526.

As illustrated in FIG. 5, the digital design system 500 includes a display manager 502. In one or more embodiments, the display manager 502 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 502 may identify, display, update, or otherwise provide various user interfaces that include one or more display elements in various layouts. In one or more embodiments, the display manager 502 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 5, the digital design system 500 also includes an input analyzer 504. The input analyzer 504 analyzes an input received by the digital design system 500 to identify a query video sequence and memory data (e.g., memory video frames and annotated memory video frames).

As further illustrated in FIG. 5, the digital design system 500 also includes a video processing module 506 configured to receive a query video sequence and segment the query video sequence into a plurality of query video clips. In one or more embodiments, the plurality of query video clips include the same number of query video frames (e.g., five frames, ten frames, etc.).

As further illustrated in FIG. 5, the digital design system 500 also includes the encoder-decoder network 508 that can include one or more trained neural networks. In one or more embodiments, a neural network includes deep learning architecture for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. As further illustrated in FIG. 5, the encoder-decoder network 508 includes encoders 514, progressive memory matching module 516, intra-clip refinement module 518, and decoder 520.

The encoders 514 can include one or more key encoders and value encoders to generates key features and value features for query video frames of query video clips, memory video frames, and annotated memory video frames. In one or more embodiments, the key encoders and the value encoder are constructed with a ResNet50 and a ResNet18, respectively. In one or more embodiments, the value encoder can extract initial memory frames value features that are passed to a fusion block configured to generate final memory frames value features by fusing memory frames key features and initial memory frames value features.

The progressive memory matching module 516 can be configured to generate value features for the query video frames. The progressive memory matching module 516 generates the value features for the query video frames by generating an affinity matrix from computing pairwise similarities between pixels using the key features from memory frames and query frames and uses the affinity scores as attention to the value features from the memory frames.

The intra-clip refinement module 518 uses transformer-based attention to refine the value features for the query video frames, generated by the progressive memory matching module 516, based on the spatio-temporal correlation among the pixels in the clip. In one or more embodiments, the intra-clip refinement module 518 uses a transformer configured to handle spatio-temporal volume. In one or more embodiments, the intra-clip refinement module 518 uses a Video Swin transformer.

The decoder 520 is configured to predict the object segmentation mask of an object using the output of the intra-clip refinement module 518. The decoder 520 is configured to gradually upsample the decoded feature and fuse it with the backbone features through a skip-connection. To handle multi-object scenarios, the decoder 520 further uses a soft-aggregation operation to merge the predicted mask of each object.

As further illustrated in FIG. 5, the digital design system 500 includes training system 510 which is configured to teach, guide, tune, and/or train one or more neural networks. In particular, the training system 510 trains neural networks, such as encoder-decoder network 508, based on training data and using loss functions 522.

As further illustrated in FIG. 5, the digital design system 500 includes a storage manager 512 that includes input data 524 and training data 526. In particular, the input data 524 may include query video sequences and memory data (e.g., memory video frames and annotated memory video frames) received by the digital design system 500. In one or more embodiments, the training data 526 may include synthetic video samples simulated by applying random deformation on static images and corresponding object masks used for a first stage training. The training data 526 may further include training video sequences used for a second stage of training.

Each of the components 502-512 of the digital design system 500 and their corresponding elements (as shown in FIG. 5) may be in communication with one another using any suitable communication technologies. It will be recognized that although components 502-512 and their corresponding elements are shown to be separate in FIG. 5, any of components 502-512 and their corresponding elements may be combined into fewer components, such as into a single facility or module, divided into more components, or configured into different components as may serve a particular embodiment.

The components 502-512 and their corresponding elements can comprise software, hardware, or both. For example, the components 502-512 and their corresponding elements can comprise one or more instructions stored on a computer-readable storage medium and executable by processors of one or more computing devices. When executed by the one or more processors, the computer-executable instructions of the digital design system 500 can cause a client device and/or a server device to perform the methods described herein. Alternatively, the components 502-512 and their corresponding elements can comprise hardware, such as a special purpose processing device to perform a certain function or group of functions. Additionally, the components 502-512 and their corresponding elements can comprise a combination of computer-executable instructions and hardware.

Furthermore, the components 502-512 of the digital design system 500 may, for example, be implemented as one or more stand-alone applications, as one or more modules of an application, as one or more plug-ins, as one or more library functions or functions that may be called by other applications, and/or as a cloud-computing model. Thus, the components 502-512 of the digital design system 500 may be implemented as a stand-alone application, such as a desktop or mobile application. Furthermore, the components 502-512 of the digital design system 500 may be implemented as one or more web-based applications hosted on a remote server. Alternatively, or additionally, the components of the digital design system 500 may be implemented in a suit of mobile device applications or "apps."

Figure 6:
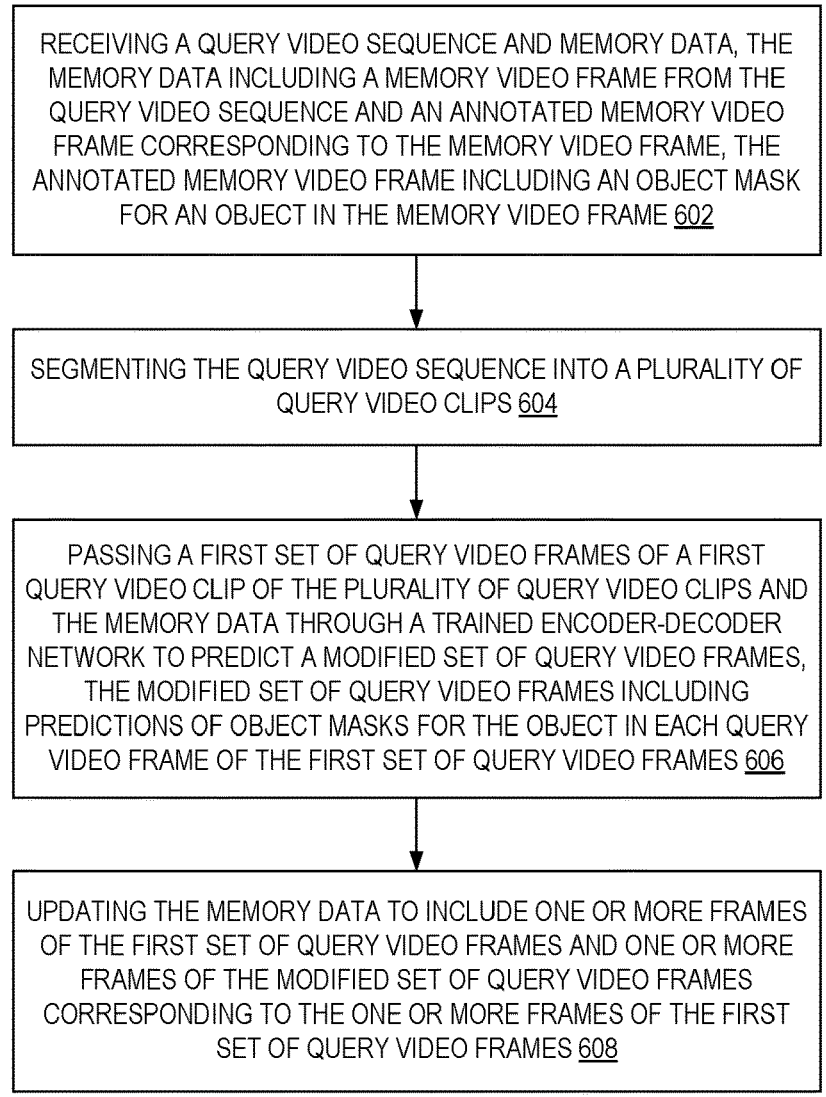
FIG. 6 illustrates a flowchart of a series of acts in a method of performing per-video clip object segmentation of objects in a video sequence in accordance with one or more embodiments.

FIGS. 1-5, the corresponding text, and the examples, provide a number of different systems and devices that allow a digital design system to perform object segmentation on frames of query video sequences using machine learning models. In addition to the foregoing, embodiments can also be described in terms of flowcharts comprising acts and steps in a method for accomplishing a particular result. For example, FIG. 6 illustrates a flowchart of an exemplary method in accordance with one or more embodiments. The method described in relation to FIG. 6 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of a series of acts in a method of performing per-video clip object segmentation of objects in a video sequence in accordance with one or more embodiments. In one or more embodiments, the method 600 is performed in a digital medium environment that includes the digital design system 500. The method 600 is intended to be illustrative of one or more methods in accordance with the present disclosure and is not intended to limit potential embodiments. Alternative embodiments can include additional, fewer, or different steps than those articulated in FIG. 6.

As shown in FIG. 6, the method 600 includes an act 602 of receiving a query video sequence and memory data. The memory data includes at least one memory video frame, where the memory video frame is a frame of the query video sequence. The memory data further includes at least one annotated memory video frame, where the least one annotated memory video frame is the same frame as the at least one memory video frame that has been annotated to include an object segmentation mask for at least one object in the least one memory video frame. In one or more embodiments, the digital design system receives the query video sequence and memory data from a user (e.g., via a computing device). In one or more embodiments, the user may select the query video sequence and memory data in an application, or the user may submit the query video sequence and memory data to a web service or an application configured to receive inputs.

As shown in FIG. 6, the method 600 also includes an act 604 of segmenting the query video sequence into a plurality of query video clips. Each query video clip of the plurality of query video clips can include a specified number of query video frames. For example, the query video sequence can be segmented into sets of video frames, where each set has the same number of frames (e.g., five, ten, etc.).

As shown in FIG. 6, the method 600 also includes an act 606 of passing a first set of query video frames of a first query video clip of the plurality of query video clips and the memory data through a trained encoder-decoder network to predict a modified set of query video frames, the modified set of query video frames including predictions of object masks for the object in each query video frame of the first set of query video frames. In one or more embodiments, the encoder-decoder network includes one or more trained neural networks. In one or more embodiments, a neural network includes deep learning architecture for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, a key encoder (e.g., a first encoder) extracts first key features from the memory video frame from the query video sequence and extracts second key features from the first set of query video frames. In one or more embodiments, a value encoder (e.g., a second encoder) extracts first value features from the memory video frame.

The digital design system then generates second value features for the first set of query video frames using the first key features, the second key features, and the first value features. In one or more embodiments, the digital design system uses a progressive memory matching process to generate the second value features for the first set of query video frames. The progressive memory matching process includes segmenting the second key features from the first set of query video frames into a plurality of segments, where each segment of the plurality of segments includes a first number of query video frames. For example, given the second key features extracted from the first set of query video frames that includes six frames, the first set of query video frames, $k^Q$, can be segmented into three segments (e.g., $k^{Q_1}$, $k^{Q_2}$, and $Q^{Q_3}$) that are two query video frames in length. The plurality of segments are then processed through the progressive memory matching process serially.

For a first segment of the plurality of segments, affinity scores are computed between pixels using the second key features, $k^{Q_1}$, of frames of the first segment and the first key features, $k^{M_1}$, from the memory video frame. Second value features, $v^{Q_1}$, for the frames of the first segment are then generated using the computed affinity scores as attention to first value features, $v^{M_1}$, from the memory video frame. As part of the progressive memory matching process, at least one frame of key and value features from the query video sequence are then appended to the key and value features from the memory video frame for increased accuracy as subsequent segments are processed. For example, a last frame of the second key features, $k^{Q_1}$, used during the first segment is appended to the first key features, $k^{M_1}$, from the memory video frame, resulting in updated first key features, k m 2. Similarly, a last frame of the second value features, $v^{Q_1}$, generated during the processing of the first segment is appended to the first value features, $v^{M_1}$, from the memory video frame, resulting in updated first value features, $v^{M_2}$. The appending step is performed for each segment, resulting in an increasing number of frames of key features and value features.

Predicting the modified set of query frames further includes generating intra-clip value features for the first set of query video frames using the second value features for the first set of query video frames and intra-clip key features from the first set of query video frames. The process includes extracting, by the first encoder, intra-clip key features from the first set of query video frames and concatenating the intra-clip key features from the first set of query video frames and the second value features for the first set of query video frames to generate the intra-clip value features. The results are then passed to a decoder, which is trained to generate the object masks for the object in each query video frame of the first set of query video frames using the intra-clip value features for the first set of query video frames.

As shown in FIG. 6, the method 600 also includes an act 608 of updating the memory data to include one or more frames of the first set of query video frames and one or more frames of the modified set of query video frames corresponding to the one or more frames of the first set of query video frames. In one or more embodiments, at least one frame of the modified set of query video frames (e.g., that includes an object segmentation mask of the object) is selected and added to the memory data. Further, the corresponding frame from the original (e.g., non-masked) set of query video frames is added to the memory data.

Figure 7:
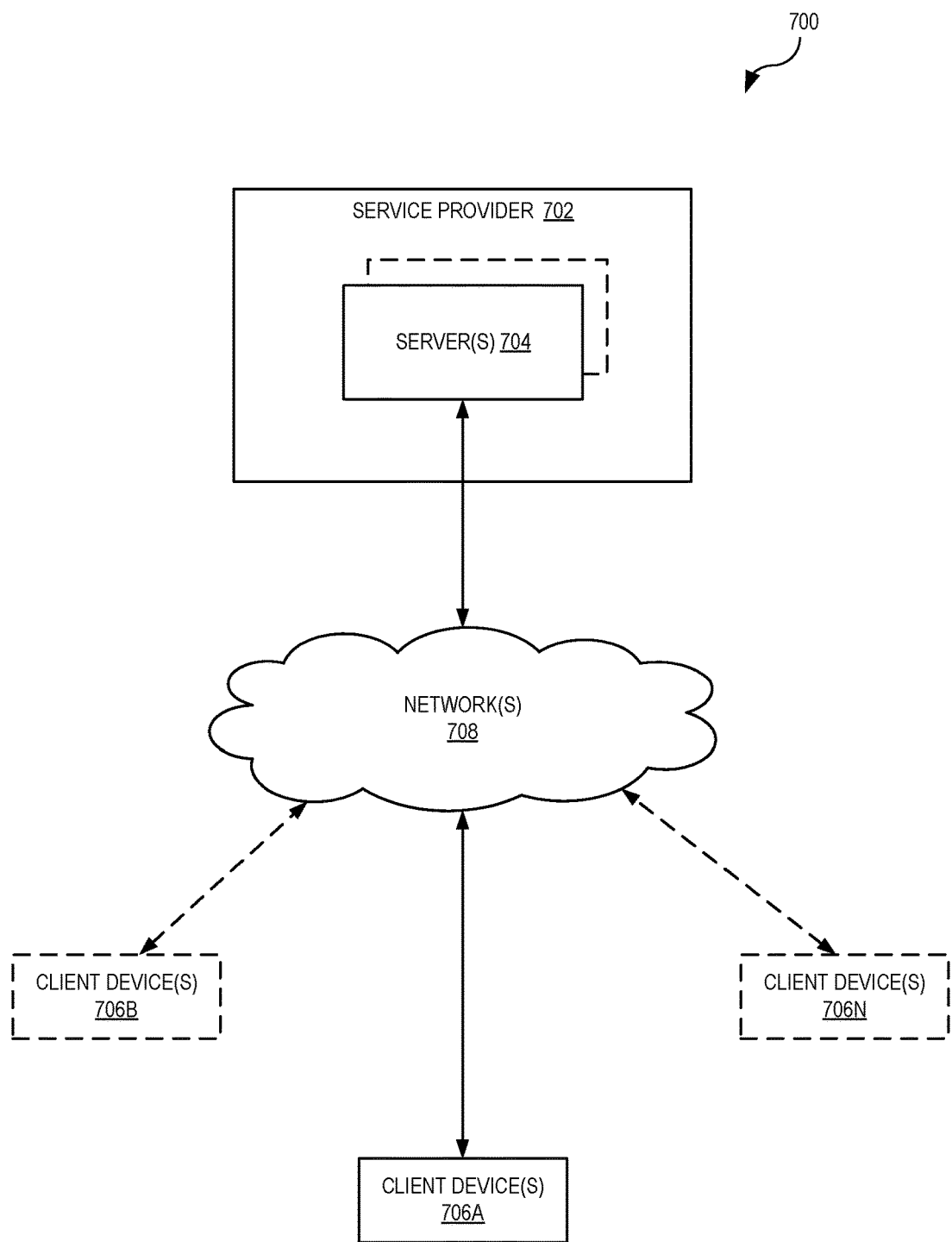
FIG. 7 illustrates a schematic diagram of an exemplary environment in which the digital design system can operate in accordance with one or more embodiments.

FIG. 7 illustrates a schematic diagram of an exemplary environment 700 in which the digital design system 500 can operate in accordance with one or more embodiments. In one or more embodiments, the environment 700 includes a service provider 702 which may include one or more servers 704 connected to a plurality of client devices 706A-706N via one or more networks 708. The client devices 706A-706N, the one or more networks 708, the service provider 702, and the one or more servers 704 may communicate with each other or other components using any communication platforms and technologies suitable for transporting data and/or communication signals, including any known communication technologies, devices, media, and protocols supportive of remote data communications, examples of which will be described in more detail below with respect to FIG. 8.

Although FIG. 7 illustrates a particular arrangement of the client devices 706A-706N, the one or more networks 708, the service provider 702, and the one or more servers 704, various additional arrangements are possible. For example, the client devices 706A-706N may directly communicate with the one or more servers 704, bypassing the network 708. Or alternatively, the client devices 706A-706N may directly communicate with each other. The service provider 702 may be a public cloud service provider which owns and operates their own infrastructure in one or more data centers and provides this infrastructure to customers and end users on demand to host applications on the one or more servers 704. The servers may include one or more hardware servers (e.g., hosts), each with its own computing resources (e.g., processors, memory, disk space, networking bandwidth, etc.) which may be securely divided between multiple customers, each of which may host their own applications on the one or more servers 704. In some embodiments, the service provider may be a private cloud provider which maintains cloud infrastructure for a single organization. The one or more servers 704 may similarly include one or more hardware servers, each with its own computing resources, which are divided among applications hosted by the one or more servers for use by members of the organization or their customers.

Similarly, although the environment 700 of FIG. 7 is depicted as having various components, the environment 700 may have additional or alternative components. For example, the environment 700 can be implemented on a single computing device with the digital design system 500. In particular, the digital design system 500 may be implemented in whole or in part on the client device 706A. Alternatively, in some embodiments, the environment 700 is implemented in a distributed architecture across multiple computing devices.

As illustrated in FIG. 7, the environment 700 may include client devices 706A-706N. The client devices 706A-706N may comprise any computing device. For example, client devices 706A-706N may comprise one or more personal computers, laptop computers, mobile devices, mobile phones, tablets, special purpose computers, TVs, or other computing devices, including computing devices described below with regard to FIG. 8. Although three client devices are shown in FIG. 7, it will be appreciated that client devices 706A-706N may comprise any number of client devices (greater or smaller than shown).

Moreover, as illustrated in FIG. 7, the client devices 706A-706N and the one or more servers 704 may communicate via one or more networks 708. The one or more networks 708 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 708 may be any suitable network over which the client devices 706A-706N may access the service provider 702 and server 704, or vice versa. The one or more networks 708 will be discussed in more detail below with regard to FIG. 8.

In addition, the environment 700 may also include one or more servers 704. The one or more servers 704 may generate, store, receive, and transmit any type of data, including input data 524 and training data 526, and/or other information. For example, a server 704 may receive data from a client device, such as the client device 706A, and send the data to another client device, such as the client device 706B and/or 706N. The server 704 can also transmit electronic messages between one or more users of the environment 700. In one example embodiment, the server 704 is a data server. The server 704 can also comprise a communication server or a web-hosting server. Additional details regarding the server 704 will be discussed below with respect to FIG. 8.

As mentioned, in one or more embodiments, the one or more servers 704 can include or implement at least a portion of the digital design system 500. In particular, the digital design system 500 can comprise an application running on the one or more servers 704 or a portion of the digital design system 500 can be downloaded from the one or more servers 704. For example, the digital design system 500 can include a web hosting application that allows the client devices 706A-706N to interact with content hosted at the one or more servers 704. To illustrate, in one or more embodiments of the environment 700, one or more client devices 706A-706N can access a webpage supported by the one or more servers 704. In particular, the client device 706A can run a web application (e.g., a web browser) to allow a user to access, view, and/or interact with a webpage or web site hosted at the one or more servers 704.

Upon the client device 706A accessing a webpage or other web application hosted at the one or more servers 704, in one or more embodiments, the one or more servers 704 can provide a user of the client device 706A with an interface to provide inputs, including a query video sequence and memory data (e.g., memory video frames and annotated memory video frames). Upon receiving the input image, the one or more servers 704 can automatically perform the methods and processes described above to process the query video sequence and memory data to segment objects in the query video sequence.

As just described, the digital design system 500 may be implemented in whole, or in part, by the individual elements 702-708 of the environment 700. It will be appreciated that although certain components of the digital design system 500 are described in the previous examples with regard to particular elements of the environment 700, various alternative implementations are possible. For instance, in one or more embodiments, the digital design system 500 is implemented on any of the client devices 706A-706N. Similarly, in one or more embodiments, the digital design system 500 may be implemented on the one or more servers 704. Moreover, different components and functions of the digital design system 500 may be implemented separately among client devices 706A-706N, the one or more servers 704, and the network 708.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
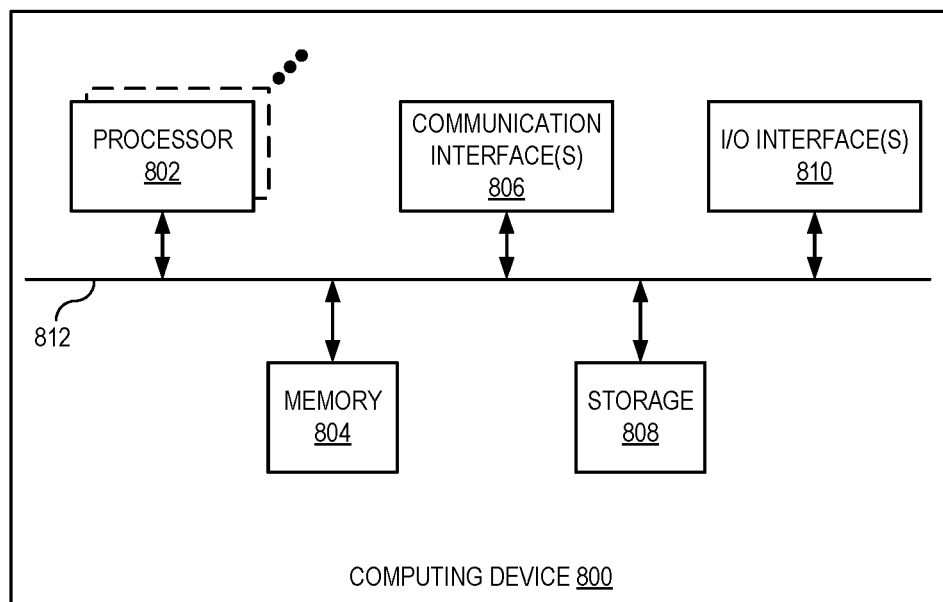
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the digital design system 500. As shown by FIG. 8, the computing device can comprise a processor 802, memory 804, one or more communication interfaces 806, a storage device 808, and one or more input or output ("I/O") devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more I/O devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method, comprising:
   receiving a query video sequence and memory data, the memory data including a memory video frame from the query video sequence and an annotated memory video frame corresponding to the memory video frame, the annotated memory video frame including an object mask for an object in the memory video frame;
   segmenting the query video sequence into a plurality of query video clips;

generating, by an encoder, features from a first set of query video frames of a first query video clip of the plurality of query video clips and the memory data;

generating intra-clip value features for the first set of query video frames based on the features generated from the first set of query video frames and the memory data;

predicting a modified set of query video frames using the intra-clip value features, the modified set of query video frames including predictions of object masks for the object in each query video frame of the first set of query video frames; and updating the memory data to include one or more frames of the first set of query video frames and one or more frames of the modified set of query video frames corresponding to the one or more frames of the first set of query video frames.

2. The computer-implemented method of claim 1, wherein predicting the modified set of query video frames using the intra-clip value features comprises:
extracting, by a first encoder, first key features from the memory video frame from the query video sequence;
extracting, by the first encoder, second key features from the first set of query video frames;
extracting, by a second encoder, first value features from the memory video frame;
generating second value features for the first set of query video frames using the first key features, the second key features, and the first value features;
generating the intra-clip value features for the first set of query video frames using the second value features for the first set of query video frames and intra-clip key features from the first set of query video frames; and
generating, using a decoder, the object masks for the object in each query video frame of the first set of query video frames using the intra-clip value features for the first set of query video frames.

3. The computer-implemented method of claim 2, wherein generating the second value features for the first set of query video frames using the first key features, the second key features, and the first value features comprises:
segmenting the second key features from the first set of query video frames into a plurality of segments, each segment of the plurality of segments including a first number of query video frames; and
for each segment of the plurality of segments:
computing affinity scores using the second key features of frames of a segment and the first key features from the memory video frame,
generating a first set of value features for the frames of the segment using the computed affinity scores as attention to first value features from the memory video frame,
appending key features of a frame of the segment to the first key features from the memory video frame from the query video sequence, and
appending values features of a frame of the segment to the first value features from the memory video frame.

4. The computer-implemented method of claim 2, wherein generating the intra-clip value features for the first set of query video frames using the second value features for the first set of query video frames and the intra-clip key features from the first set of query video frames further comprises:
extracting, by the first encoder, intra-clip key features from the first set of query video frames; and
concatenating the intra-clip key features from the first set of query video frames and the second value features for the first set of query video frames to generate the intra-clip value features.

5. The computer-implemented method of claim 1, wherein frames from the first set of query video frames are processed through a trained encoder-decoder network in parallel.

6. The computer-implemented method of claim 1, wherein each query video clip of the plurality of query video clips associated with a specified number of query video frames.

7. The computer-implemented method of claim 1, further comprising:
for a second set of query video frames for a second query video clip of the plurality of query video clips:
generating, by the encoder, features from the second set of query video frames and the updated memory data,
generating intra-clip value features for the second set of query video frames based on the features generated from the second set of query video frames and the updated memory data,
predicting a second modified set of query video frames using the intra-clip value features for the second set of query video frames, the second modified set of query video frames including predictions of the object masks for the object in each query video frame of the second set of query video frames, and
updating the updated memory data to include one or more of the second set of query video frames and one or more of the modified set of query video frames corresponding to the one or more of the second set of query video frames.

8. The computer-implemented method of claim 1, wherein the plurality of query video clips are processed through a trained encoder-decoder network serially.

9. A non-transitory computer-readable medium storing executable instructions, which when executed by a processing device, cause the processing device to perform operations comprising:
receiving a query video sequence and memory data, the memory data including a memory video frame from the query video sequence and an annotated memory video frame corresponding to the memory video frame, the annotated memory video frame including an object mask for an object in the memory video frame;
segmenting the query video sequence into a plurality of query video clips;
generating, by an encoder, features from a first set of query video frames of a first query video clip of the plurality of query video clips and the memory data;
generating intra-clip value features for the first set of query video frames based on the features generated from the first set of query video frames and the memory data;
predicting a modified set of query video frames using the intra-clip value features, the modified set of query video frames including predictions of object masks for the object in each query video frame of the first set of query video frames; and
updating the memory data to include one or more frames of the first set of query video frames and one or more frames of the modified set of query video frames corresponding to the one or more frames of the first set of query video frames.

10. The non-transitory computer-readable medium of claim 9, wherein to predict the modified set of query video frames using the intra-clip value features the instructions further cause the processing device to perform operations comprising:

extracting, by a first encoder, first key features from the memory video frame from the query video sequence;

extracting, by the first encoder, second key features from the first set of query video frames;

extracting, by a second encoder, first value features from the memory video frame;

generating second value features for the first set of query video frames using the first key features, the second key features, and the first value features;

generating the intra-clip value features for the first set of query video frames using the second value features for the first set of query video frames and intra-clip key features from the first set of query video frames; and generating, using a decoder, the object masks for the object in each query video frame of the first set of query video frames using the intra-clip value features for the first set of query video frames.

11. The non-transitory computer-readable medium of claim 10, wherein to generate the second value features for the first set of query video frames using the first key features, the second key features, and the first value features the instructions further cause the processing device to perform operations comprising:

segmenting the second key features from the first set of query video frames into a plurality of segments, each segment of the plurality of segments including a first number of query video frames; and for each segment of the plurality of segments:

computing affinity scores using the second key features of frames of a segment and the first key features from the memory video frame, generating a first set of value features for the frames of the segment using the computed affinity scores as attention to first value features from the memory video frame, appending key features of a frame of the segment to the first key features from the memory video frame from the query video sequence, and appending values features of a frame of the segment to the first value features from the memory video frame.

12. The non-transitory computer-readable medium of claim 10, wherein to generate the intra-clip value features for the first set of query video frames using the second value features for the first set of query video frames and the intra-clip key features from the first set of query video frames the instructions further cause the processing device to perform operations comprising:

extracting, by the first encoder, intra-clip key features from the first set of query video frames; and concatenating the intra-clip key features from the first set of query video frames and the second value features for the first set of query video frames to generate the intra-clip value features.

13. The non-transitory computer-readable medium of claim 9, wherein frames from the first set of query video frames are processed through a trained encoder-decoder network in parallel.

14. The non-transitory computer-readable medium of claim 9, wherein the instructions further cause the processing device to perform operations comprising:

for a second set of query video frames for a second query video clip of the plurality of query video clips:

generating, by the encoder, features from the second set of query video frames and the updated memory data, generating intra-clip value features for the second set of query video frames based on the features generated from the second set of query video frames and the updated memory data, predicting a second modified set of query video frames using the intra-clip value features for the second set of query video frames, the second modified set of query video frames including predictions of the object masks for the object in each query video frame of the second set of query video frames, and updating the updated memory data to include one or more of the second set of query video frames and one or more of the modified set of query video frames corresponding to the one or more of the second set of query video frames.

15. A system comprising:

a memory component; and a processing device coupled to the memory component, the processing device to perform operations comprising:

receiving a query video sequence and memory data, the memory data including a memory video frame from the query video sequence and an annotated memory video frame corresponding to the memory video frame, the annotated memory video frame including an object mask for an object in the memory video frame;

segmenting the query video sequence into a plurality of query video clips;

generating, by an encoder, features from a first set of query video frames of a first query video clip of the plurality of query video clips and the memory data;

generating intra-clip value features for the first set of query video frames based on the features generated from the first set of query video frames and the memory data;

predicting a modified set of query video frames using the intra-clip value features, the modified set of query video frames including predictions of object masks for the object in each query video frame of the first set of query video frames; and updating the memory data to include one or more frames of the first set of query video frames and one or more frames of the modified set of query video frames corresponding to the one or more frames of the first set of query video frames.

16. The system of claim 15, wherein to predict the modified set of query video frames using the intra-clip value features the processing device further performs operations comprising:

extracting, by a first encoder, first key features from the memory video frame from the query video sequence;

extracting, by the first encoder, second key features from the first set of query video frames;

extracting, by a second encoder, first value features from the memory video frame;

generating second value features for the first set of query video frames using the first key features, the second key features, and the first value features;

generating the intra-clip value features for the first set of query video frames using the second value features for the first set of query video frames and intra-clip key features from the first set of query video frames; and generating, using a decoder, the object masks for the object in each query video frame of the first set of query video frames using the intra-clip value features for the first set of query video frames.

17. The system of claim 16, wherein to generate the second value features for the first set of query video frames using the first key features, the second key features, and the first value features the processing device further performs operations comprising:
   segmenting the second key features from the first set of query video frames into a plurality of segments, each segment of the plurality of segments including a first number of query video frames; and
   for each segment of the plurality of segments:
      computing affinity scores using the second key features of frames of a segment and the first key features from the memory video frame,
      generating a first set of value features for the frames of the segment using the computed affinity scores as attention to first value features from the memory video frame,
      appending key features of a frame of the segment to the first key features from the memory video frame from the query video sequence, and
      appending values features of a frame of the segment to the first value features from the memory video frame.

18. The system of claim 16, wherein to generate the intra-clip value features for the first set of query video frames using the second value features for the first set of query video frames and the intra-clip key features from the first set of query video frames the processing device further performs operations comprising:
   extracting, by the first encoder, intra-clip key features from the first set of query video frames; and
   concatenating the intra-clip key features from the first set of query video frames and the second value features for the first set of query video frames to generate the intra-clip value features.

19. The system of claim 15, wherein frames from the first set of query video frames are processed through a trained encoder-decoder network in parallel.

20. The system of claim 15, wherein the processing device further performs operations comprising:
   for a second set of query video frames for a second query video clip of the plurality of query video clips:
      generating, by the encoder, features from the second set of query video frames and the updated memory data,
      generating intra-clip value features for the second set of query video frames based on the features generated from the second set of query video frames and the updated memory data,
      predicting a second modified set of query video frames using the intra-clip value features for the second set of query video frames, the second modified set of query video frames including predictions of the object masks for the object in each query video frame of the second set of query video frames, and
      updating the updated memory data to include one or more of the second set of query video frames and one or more of the modified set of query video frames corresponding to the one or more of the second set of query video frames.

* * * * *